United States Patent
Breuer et al.

(10) Patent No.: US 10,040,557 B2
(45) Date of Patent: Aug. 7, 2018

(54) FLIGHT ATTENDANT SEAT, ARRANGEMENT HAVING A FLIGHT ATTENDANT SEAT, AND AIRCRAFT AREA

(71) Applicant: Airbus Operations GmbH, Hamburg (DE)

(72) Inventors: Matthias Breuer, Hamburg (DE); Sabrina Moje, Hamburg (DE)

(73) Assignee: Airbus Operations GmbH, Kreetslag (DE)

(*) Notice: Subject to any disclaimer, the term of this patent is extended or adjusted under 35 U.S.C. 154(b) by 0 days.

(21) Appl. No.: 15/616,439

(22) Filed: Jun. 7, 2017

(65) Prior Publication Data

US 2017/0267356 A1    Sep. 21, 2017

Related U.S. Application Data

(63) Continuation of application No. PCT/EP2015/079027, filed on Dec. 8, 2015.

(30) Foreign Application Priority Data

Dec. 9, 2014 (DE) .................. 10 2014 225 250

(51) Int. Cl.
B64D 13/00     (2006.01)
B64D 11/06     (2006.01)

(52) U.S. Cl.
CPC ...... B64D 11/0691 (2014.12); B64D 11/0639 (2014.12)

(58) Field of Classification Search
CPC .................. B64D 11/0691; B64D 11/0639
See application file for complete search history.

(56) References Cited

U.S. PATENT DOCUMENTS 1,412,367 A    4/1922    Noack
1,761,673 A    6/1930    Laursen
(Continued)

FOREIGN PATENT DOCUMENTS

DE    102005009750    9/2006
DE    102011116519    4/2013
(Continued)

OTHER PUBLICATIONS

International Search Report, dated Feb. 29, 2016, priority document.
German Search Report, dated Nov. 18, 2015, priority document.

*Primary Examiner* — Philip J Bonzell
(74) *Attorney, Agent, or Firm* — Greer, Burns & Crain Ltd.

(57) ABSTRACT

A flight attendant seat comprises a carrier device having a first surface, a seat element movably coupled to the carrier device, and a backrest element movably coupled to the carrier device and operatively coupled to the seat element. The seat is movable between an operative position, permitting the use of the seat by a flight attendant, and an inoperative position in which the seat element and the backrest element are positioned, relative to the carrier device, such that they do not protrude from the carrier device first surface. The seat may be positioned in such a way, relative to a passenger seat or a row of passenger seats, that the rear side of the backrest element faces towards the rear side of a backrest of the passenger seat or the rear side of a backrest of at least one passenger seat belonging to the row of passenger seats.

20 Claims, 3 Drawing Sheets

(56) References Cited

U.S. PATENT DOCUMENTS

| | | | | |
|---|---|---|---|---|
| 1,784,390 | A * | 12/1930 | Rice | A47C 9/06 |
| | | | | 297/14 |
| 3,594,037 | A * | 7/1971 | Sherman | A47C 1/036 |
| | | | | 297/14 |
| 4,902,069 | A * | 2/1990 | Lehnert | B64D 11/0691 |
| | | | | 297/14 |
| 9,327,836 | B2 * | 5/2016 | Weitzel | B64D 11/06 |
| 2006/0202085 | A1 | 9/2006 | Schotte et al. | |
| 2014/0209741 | A1 | 7/2014 | Boenning et al. | |
| 2014/0224931 | A1 * | 8/2014 | Weitzel | B64D 11/06 |
| | | | | 244/118.6 |
| 2014/0312173 | A1 | 10/2014 | Ehlers et al. | |
| 2014/0319275 | A1 * | 10/2014 | Najd | B64D 11/02 |
| | | | | 244/118.6 |
| 2015/0251762 | A1 * | 9/2015 | Ehlers | B64D 11/06 |
| | | | | 244/118.6 |

FOREIGN PATENT DOCUMENTS

| | | | |
|---|---|---|---|
| EP | 0349762 | 1/1990 | |
| EP | 2724938 | 4/2014 | |
| EP | 2796370 | 10/2014 | |
| FR | 2962714 | 1/2012 | |
| JP | H10-157 566 | 6/1998 | |
| WO | WO-2014080025 A1 * | 5/2014 | ............ B64D 11/06 |
| WO | 2014179348 | 11/2014 | |

* cited by examiner

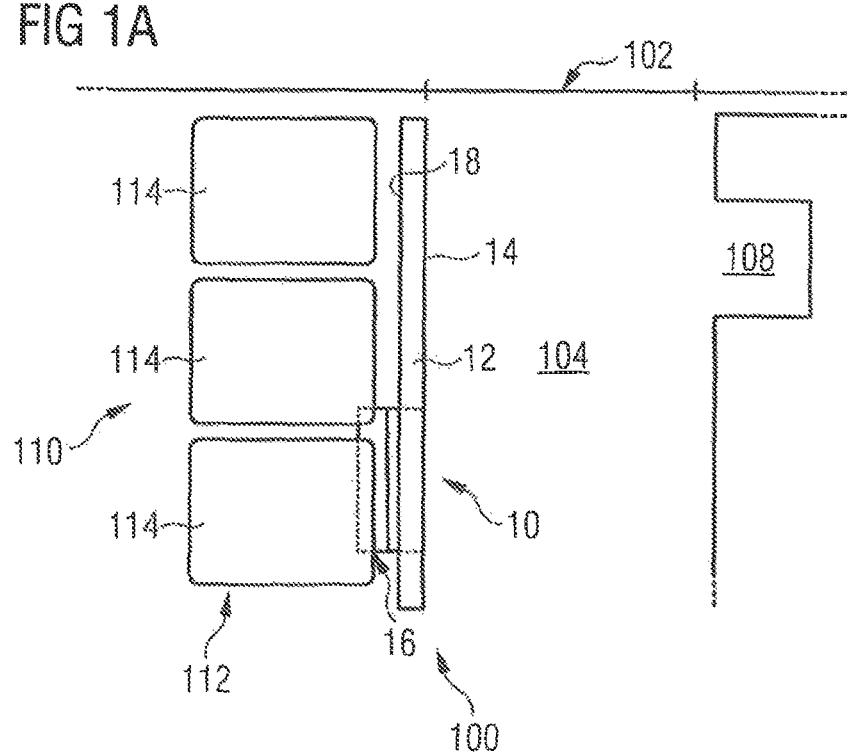
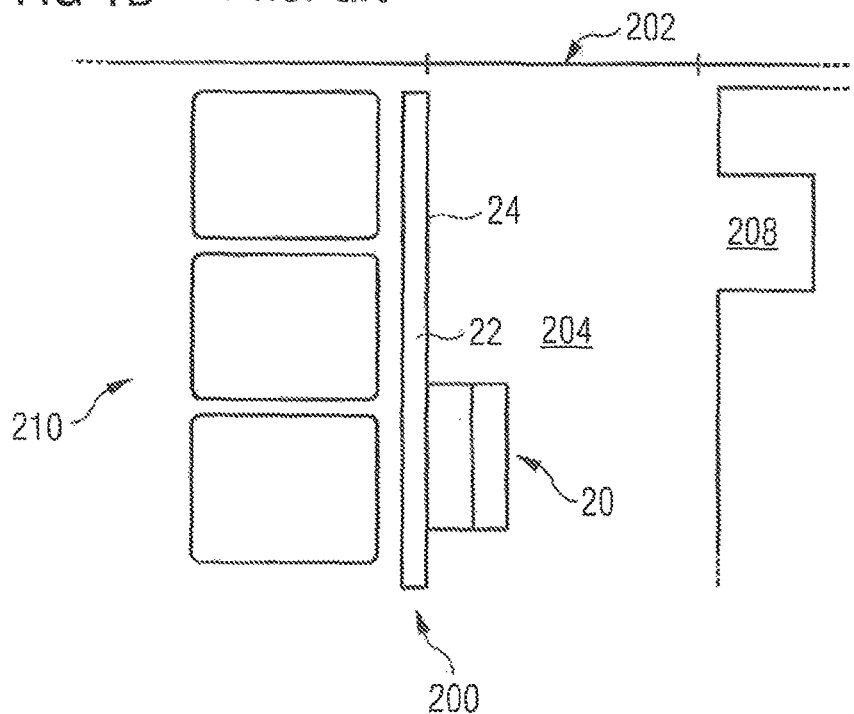

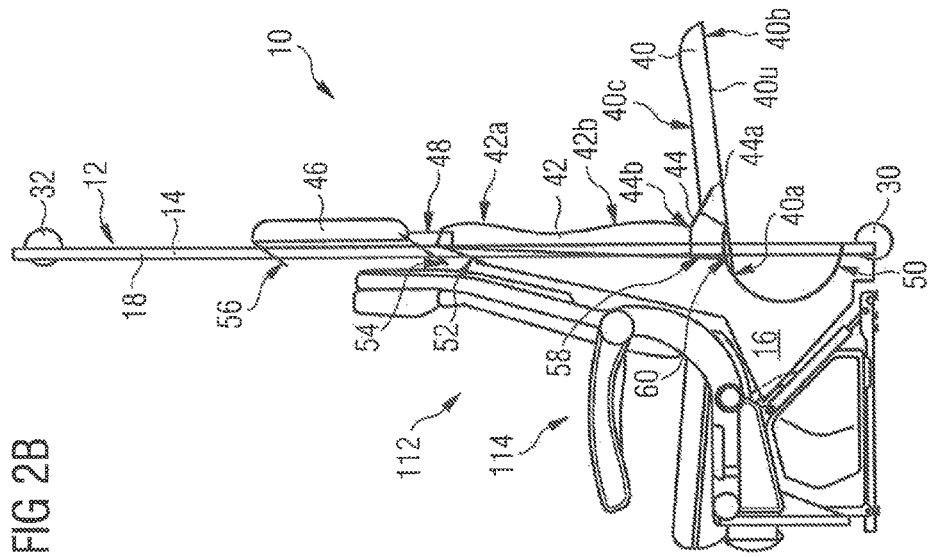
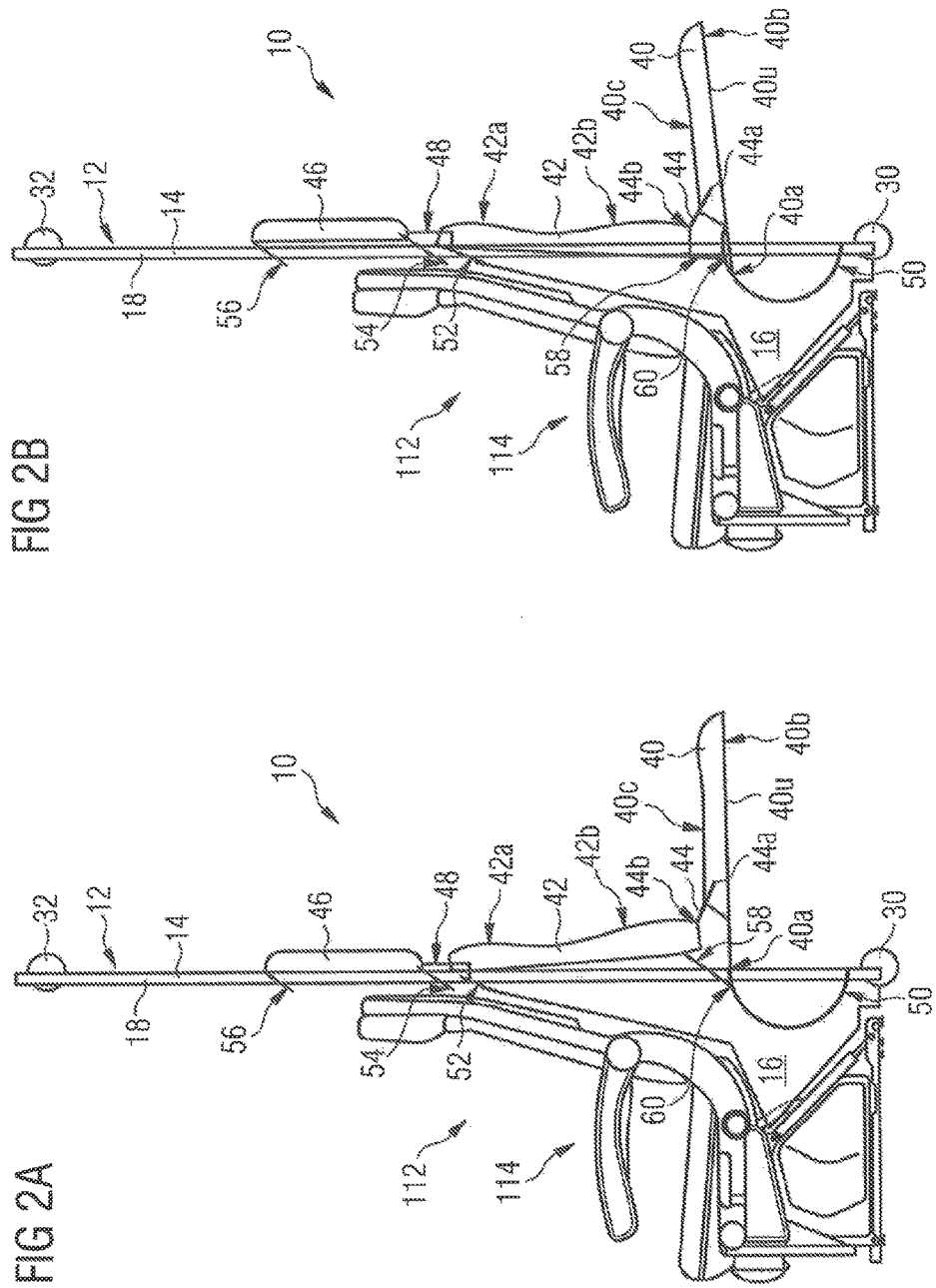

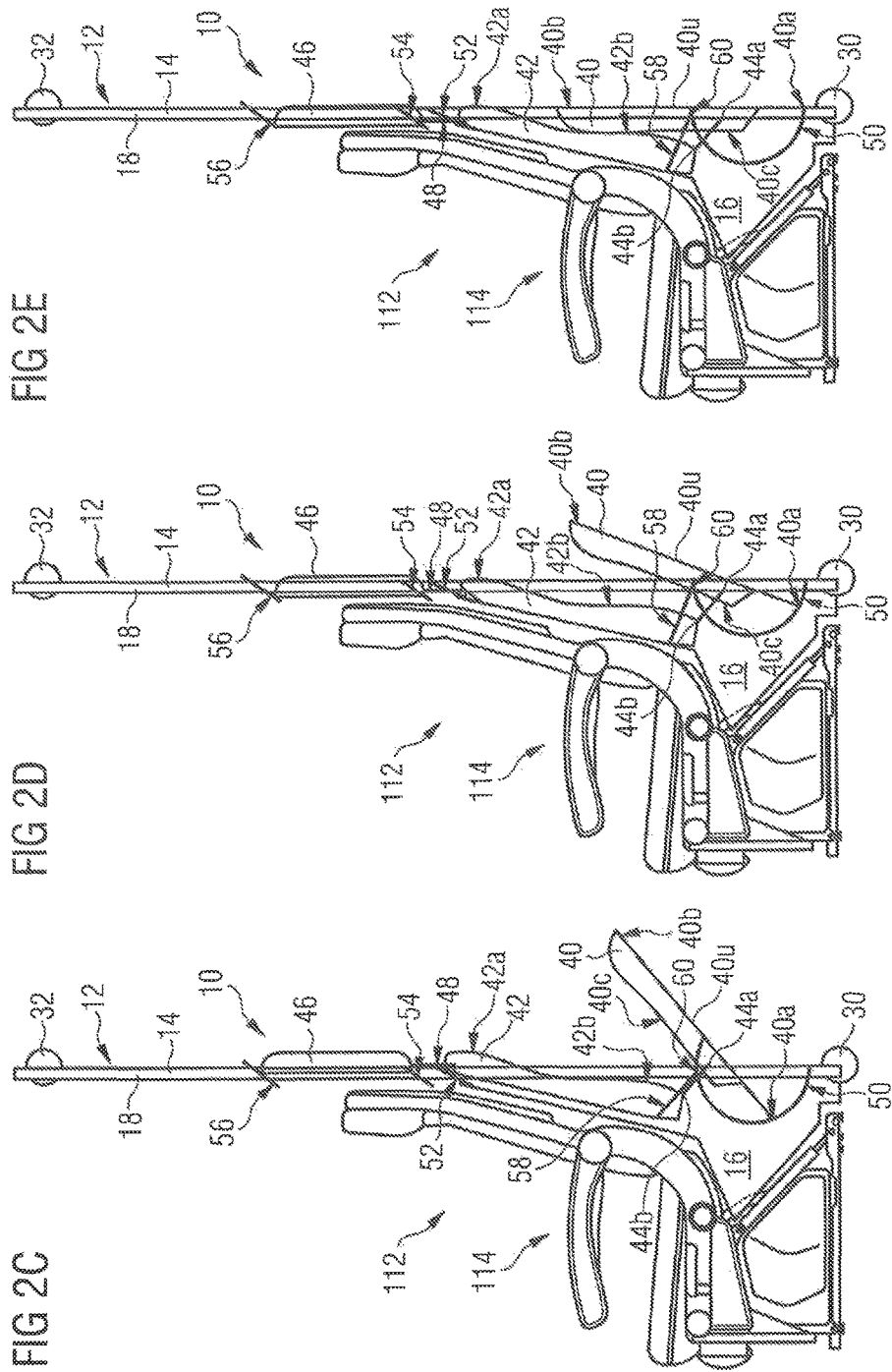

FLIGHT ATTENDANT SEAT, ARRANGEMENT HAVING A FLIGHT ATTENDANT SEAT, AND AIRCRAFT AREA

CROSS-REFERENCES TO RELATED APPLICATIONS

This application is a continuation of International Application PCT/EP2015/079027 filed Dec. 8, 2015, designating the United States and published on Jun. 16, 2016 as WO 2016/091907. This application also claims the benefit of the German patent application No. 10 2014 225 250.4 filed on Dec. 9, 2014. The entire disclosures of the above are incorporated herein by way of reference.

BACKGROUND OF THE INVENTION

The invention relates to a flight attendant seat, an arrangement having a flight attendant seat and a passenger seat or a row of passenger seats, and also to an aircraft area which comprises such an arrangement.

The passenger cabin of a modern commercial aircraft is usually equipped with flight attendant seats on which flight attendants can take their places during the takeoff and landing of the aircraft. The flight attendant seats are usually arranged in the door areas of the aircraft cabin. From DE 10 2005 009 750 A1 and US 2006/0202085 A1, a flight attendant seat having a folding seat element is known, the backrest of which is arranged adjacent to a backrest of a passenger seat. The backrest of the flight attendant seat is pivotably mounted on a pedestal via a joint. It is thus possible, in operating situations of the aircraft in which the flight attendant seat is not in use, to tilt the backrest of the flight attendant seat in a direction that faces away from the passenger seat. This permits unhindered adjustment of the backrest of the passenger seat. In addition, DE 10 2011 116 519 A1 and also US 2014/0224931 A1 disclose a flight attendant seat which comprises a bearer element which comprises a backrest section and also a pedestal section that carries the backrest section. Fastened to the bearer element is a seat element. The bearer element is arranged as a separating element between a door aisle of the aircraft cabin and a row of passenger seats and is configured in such a way that a free space, which is located between the floor of the aircraft cabin and the rear area of the row of passenger seats and which is normally unused, is constructed so as to accommodate at least a first stowage compartment. For this purpose, a section of a rear wall of the bearer element is inclined, at least along the section of the first stowage compartment integrated into the bearer element, in such a way that a cross-sectional area of the bearer element increases in the direction of the pedestal section of the bearer element. In other words, a lower section of the bearer element extends into the free space which usually remains between the door aisle of the aircraft cabin and the rear side of an adjoining row of passenger seats.

SUMMARY OF THE INVENTION

An object at which the invention is aimed is to provide a flight attendant seat which is so designed that it uses hitherto unused space, such as, for example, the unused free space indicated in the previous paragraph, between the door of the aircraft cabin and a rear side of an adjoining row of passenger seats, and also, in its inoperative position, that is, in its stowed position, causes as little as possible, and ideally no, additional loss of space within the passenger cabin of the aircraft. The object at which the invention is aimed is also to make available a space-saving arrangement of aircraft cabin components having a flight attendant seat of this kind, and also an aircraft area within which a space-saving arrangement of this kind is provided.

The flight attendant seat according to the invention comprises a carrier device having a first surface, a seat element which is movably coupled to the carrier device and a backrest element which is movably coupled to the carrier device and is operatively coupled to the seat element. When the flight attendant seat is installed in the passenger cabin of an aircraft, the carrier device is fastened to the floor of the aircraft cabin and/or to a wall of the cabin and/or to a ceiling of the cabin. The first surface of the carrier device then preferably extends parallel to a cross-sectional area in the case of a cross-section through the aircraft cabin perpendicular to a longitudinal axis of the aircraft cabin. The carrier device may be provided with at least one suitable fastening device for fastening to the floor of the aircraft cabin and/or to the wall of the cabin and/or to the ceiling of the cabin. At least one fastening device may, for example, be constructed in a manner complementary to a seat rail provided in the floor of the aircraft cabin, and may thus permit fastening of the carrier device, and thereby of the flight attendant seat, within the aircraft cabin via the seat rail(s) provided in the floor of the cabin. As an alternative, or in addition to this, it is also conceivably possible to provide the carrier device with at least one fastening device which is constructed for the purpose of acting upon a structural element of the aircraft fuselage, such as a stringer, in the area of the wall of the aircraft cabin and/or of the ceiling of the cabin.

The flight attendant seat is movable between an operative position, which permits the use of the flight attendant seat by a flight attendant, and an inoperative position in which the seat element and the backrest element are positioned, relative to the carrier device, in such a way that they do not protrude from the first surface of the carrier device. In other words, both the seat element and the backrest element of the flight attendant seat withdraw, at least in part, when the flight attendant seat is in its inoperative position, behind the first surface of the carrier device, and/or terminate, at least in certain sections, flush with this first surface of the carrier device. Consequently, the carrier device preferably has at least one opening in its first surface, out of which the seat element and also the backrest element of the flight attendant seat can emerge when the flight attendant seat is moved from its inoperative position into its operative position and, when the flight attendant seat is moved from its operative position into its inoperative position, the seat element and backrest element can be moved in such a way that neither the seat element nor the backrest element protrude from the first surface of the carrier device. In order to close this opening in the first surface of the carrier device when the flight attendant seat is located in its inoperative position, the carrier device may be provided with a suitable covering for this purpose. This covering is preferably moved, when or after the flight attendant seat is moved into its inoperative position, into a closing position in which the covering covers the opening in the first surface of the carrier device at least insofar as the seat element and the backrest element withdraw, at least in certain sections, behind the first surface of the carrier device. Sections of the seat element and backrest element that terminate flush with the first surface of the carrier device may—but do not have to—be covered by the covering. Of course, these sections already cover the opening themselves.

The flight attendant seat may also comprise a headrest element which is movably coupled to the carrier device. A headrest element of this kind is then operatively coupled to the backrest element of the flight attendant seat and is positioned, when the seat is in its inoperative position, in such a way that it does not protrude from the first surface of the carrier device. What has been stated previously in respect of the seat element and also the backrest element as regards the inoperative position of the flight attendant seat applies to the headrest element. That is to say, the headrest element, too, is positioned in such a way, when the flight attendant seat is in its inoperative position, that it withdraws, either entirely or at least for the most part, behind the first surface of the carrier device and/or terminates, at least in part, flush with the first surface of the carrier device. The opening described in the preceding paragraph in the first surface of the carrier device is then preferably dimensioned in such a way that the headrest element, too, is able to pass into the carrier device and out of the latter again, together with the backrest element and the seat element, when the flight attendant seat is moved between its operative position and inoperative position. What has been stated previously applies, in a similar manner, to the optional covering for the opening.

It is also conceivable that a headrest is provided fixedly mounted on or within the carrier device so as to provide a rest for a flight attendant's head when the flight attendant uses the flight attendant seat in its operative position.

The carrier device may have a guiding arrangement for guiding the seat element and the backrest element and also, optionally, for guiding the headrest element when the flight attendant seat is moved between its operative position and inoperative position. A guiding arrangement of this kind preferably comprises a plurality of slideways and also at least one pivoting element. Under these circumstances, the seat element may be guided in at least one first slideway. The backrest element may be guided in at least one second slideway and on at least one pivoting element. The headrest element may be guided in at least one third, and preferably at least one fourth, slideway. The first, second, third and/or fourth slideway preferably comprises a pair of guide rails arranged on opposite sides of the seat element, the backrest element and the headrest element, respectively. In other words, the seat element may be guided on two opposite sides in one guide rail in each case, the backrest element may be guided on two opposite sides in one guide rail in each case and/or the headrest element may be guided on two opposite sides in at least one, and preferably in two, guide rails. For each slideway, these guide rails are advantageously of complementary construction. The slideways or guide rails may be constructed, for example, in the form of grooves in the carrier device. Furthermore, the backrest element may also be guided on two pivoting elements which likewise act upon two opposite sides of the backrest element. The pivoting element(s) may (each) be realized in the form of a trapezoid joint.

The at least one second slideway of the backrest element preferably extends in a rectilinear manner and forms a first angle with a longitudinal axis of the carrier device. Furthermore, the at least one third slideway of the headrest element also preferably extends in a rectilinear manner and forms a second angle, that differs from the first angle, with the longitudinal axis of the carrier device. What has been stated previously in the case of the third slideway applies to a possible fourth slideway for the subsidiary guidance of the headrest element. When the flight attendant seat is mounted in the passenger cabin of an aircraft, the longitudinal axis of the carrier device extends perpendicularly to the floor of the aircraft cabin, that is, extends in the vertical direction of the aircraft cabin.

The movement of the flight attendant seat between its operative and inoperative positions may comprise a corresponding movement of the seat element between its positions when the flight attendant seat is in its operative and inoperative positions, and also a corresponding movement of the backrest element between its positions when the flight attendant seat is in its operative and inoperative positions. The operative coupling of the seat element to the backrest element then preferably takes place by means of at least one first coupling element in such a way that the movement of the seat element between its positions when the flight attendant seat is in its operative and inoperative positions brings about the movement of the backrest element between its positions when the flight attendant seat is in its operative and inoperative positions for the purpose of moving the flight attendant seat between its operative and inoperative positions.

The combination of the guiding of the seat element in its at least one first slideway with the operative coupling of the seat element to the backrest element is preferably such that the seat element performs a combined pivoting-and-sliding movement for the purpose of transferring the seat element between its positions when the flight attendant seat is in its operative and inoperative positions. When the seat element is moved inwards into the carrier device, the coupling of the seat element to the backrest element then brings about a sliding-back of that section of the backrest element which is guided in the at least one second slideway, and also a pivoting of that section of the backrest element which is guided on the at least one pivoting element, into the carrier device. An upper section of the backrest element is preferably guided in the at least one second slideway, and a lower section of the backrest element is coupled to the at least one pivoting element and also to the coupling element for operative coupling to the seat element.

In addition, it is advantageous if the movement of the flight attendant seat between its operative and inoperative positions also comprises a corresponding movement of the headrest element between its positions when the flight attendant seat is in its operative and inoperative positions. For this purpose, the backrest element may be coupled, by means of at least one second coupling element, to the headrest element in such a way that the movement of the backrest element between its positions when the flight attendant seat is in its operative and inoperative positions brings about the movement of the headrest element between its positions when the flight attendant seat is in its operative and inoperative positions. For this purpose, that section of the backrest element which is guided in the at least one second slideway is preferably coupled to the headrest element in such a way that a sliding-back of that section of the backrest element which is guided in the at least one second slideway brings about, when the flight attendant seat is moved into the carrier device from its operative position into its inoperative position, the entrainment of the headrest element, which is guided in the at least one third slideway, into the carrier device in a corresponding sliding movement. This sliding movement of the headrest element along the at least one third slideway and into the carrier device may be assisted by the at least one fourth slideway of the headrest element.

The carrier device as a whole may, at least in certain sections, be constructed with a thickness or depth such that the movable elements (seat element, backrest element and, if present, headrest element) of the flight attendant seat can be received within the carrier device completely or at least in such a way that, when the flight attendant seat is in its inoperative position, at most sections of these movable elements terminate flush with the first surface of the carrier device, but the movable elements at least do not protrude from the first surface of the carrier device. In other words, a cross-section through the carrier device may have a face, perpendicularly to the first surface of the carrier device, the width of which in the vertical direction of the carrier device is adapted, at least in certain sections, according to the required receiving space. If the carrier device does not have sufficient thickness or depth, at least a part or section of at least one of the movable elements (seat element, backrest element and, if present, headrest element) of the flight attendant seat may, when the flight attendant seat is in its inoperative position, protrude from a second surface of the carrier device that lies opposite the first surface of the carrier device. When the flight attendant seat is in its operative position, however, the seat element, the backrest element and, if present, the headrest element, too, may be positioned in such a way, relative to the carrier device, that they do not protrude from that second surface of the carrier device which lies opposite the first surface of the carrier device. In other words, the seat element, the backrest element and, if present, the headrest element, too, may withdraw, at least in part or in certain sections, behind the second surface of the carrier device in the direction of the first surface of the carrier device, that is, into the carrier device, at least when the flight attendant seat moves into its operative position, and/or terminate, at least in part or in certain sections, flush with this second surface of the carrier device when the flight attendant seat is located in its operative position. Irrespective of the thickness of the carrier device, the second surface of the carrier device may extend parallel to the first surface of the carrier device. However, this is not imperative.

In its shape and size, the carrier device is preferably constructed in such a way that it is capable of diverting, via a floor of the aircraft cabin and/or a wall of the cabin and/or a ceiling of the cabin, a specified maximum force which may be introduced when the flight attendant seat is being used in its operative position by a flight attendant. The maximum force which is to be diverted, via the carrier device, to the floor of the aircraft cabin and/or to the wall of the cabin and/or to the ceiling of the cabin, is specified by appropriate licensing regulations. The maximum force in question is, in particular, a calculated maximum force which acts upon the flight attendant seat in an emergency. For example it is possible to assume, as the specified maximum force, a force which acts upon the flight attendant seat when the latter is exposed to an acceleration of 9 G or 16 G. The at least one fastening device for fastening the carrier device to the floor of the aircraft cabin and/or to the wall of the cabin and/or to the ceiling of the cabin is then preferably constructed in a manner suitable for permitting the diversion of this maximum force.

The carrier device preferably comprises a cabin partition, in which case the two surfaces of the carrier device, that is, its first surface and its second surface, then correspond to opposite surfaces of the cabin partition. A cabin partition of this kind preferably extends transversely to the longitudinal axis of the aircraft when the flight attendant seat is installed in the passenger cabin of an aircraft. A cabin partition of this kind is advantageously provided in an aircraft cabin for the purpose of separating a passenger seating area from a door aisle.

In addition, it is possible to provide, in a cabin partition of this kind, a receiving space for a stretcher and/or space for receiving items of emergency equipment. This may lead to a structural weakening of the cabin partition, that is, the carrier device. It is therefore, and even quite generally, preferred practice to provide the carrier device, in the area of the second surface, with a reinforcing structure which is then likewise encompassed by the carrier device and is constructed for the subsidiary diversion of a force that has the maximum effect upon the flight attendant seat. The subsidiary diversion of force via the reinforcing structure preferably takes place at the floor of the aircraft cabin. The reinforcing structure advantageously has at least one further fastening device for fastening the reinforcing structure to the floor of the aircraft cabin, to the side wall of the cabin and/or to the ceiling of the cabin. This fastening device should then be constructed for the subsidiary diversion of the force which has the maximum effect upon the flight attendant seat.

Not only a cabin partition but also any other cabin module, such as a lavatory, a galley, a stowage module, a crew rest compartment or a door may form the carrier device for the flight attendant seat. Further, the above mentioned installation location for the carrier device between a passenger seating area and a door aisle is not to be regarded as limiting for the present application. Rather, it is also conceivable for the carrier device to be located in any other suitable place along or within a door aisle or along or within the overall cabin aisle region, also including each main aisle of the aircraft cabin besides the door aisles. Further additional or alternative possible installation locations for the flight attendant seat are the galley(s) and/or the lavatory module(s). The orientation of the flight attendant seat when installed within the aircraft cabin may be towards the back or front of the aircraft cabin.

The movement of the flight attendant seat between its operative and inoperative positions may take place automatically or manually. Manual movement of the flight attendant seat from its operative position into its inoperative position preferably takes place in a spring-assisted manner. For this purpose, a draw spring may act, on the one hand, upon the seat element of the flight attendant seat and, on the other, upon its carrier device.

It is also conceivably possible to construct the flight attendant seat as a double flight attendant seat. For this purpose, the seat element and backrest element and, if present, the headrest element, may each be of sufficiently wide construction to offer space for two flight attendants side by side. As an alternative to this, it is also conceivably possible to provide, side by side on the carrier device of the flight attendant seat, two seat elements as well as two backrest elements and also, if desired, two headrest elements, as have been described previously in the case of the single embodiment of the flight attendant seat. The operative coupling between the seat element and backrest element or between the backrest element and headrest element then takes place as has been described previously in the case of the single embodiment of the flight attendant seat. In this case, these movable elements (two seat elements, two backrest elements and, if applicable, two headrest elements) of the flight attendant seat in the double embodiment then simply share a common carrier device. If the double flight attendant seat is constructed with two seat elements and two backrest elements, the carrier device may have either a common opening or two separate openings in its first surface. If the carrier device has only a common opening, the covering is preferably constructed so as to be divided in two in such a way that, if only one flight attendant seat of the double embodiment is used, the flight attendant seat that remains in its inoperative position can be covered. At least, however, the covering of the opening should permit selective covering of that area of the opening in the first surface of the carrier device within which the unused flight attendant seat belonging to the double embodiment is received in its inoperative position.

An arrangement according to the invention comprises a flight attendant seat which has been described above. The arrangement also comprises a passenger seat or a row of passenger seats having at least one passenger seat. The flight attendant seat is positioned in such a way, relative to the passenger seat or row of passenger seats, that the rear side of the backrest element of the flight attendant seat faces towards the rear side of a backrest of the passenger seat or the rear side of a backrest of at least one passenger seat belonging to the row of passenger seats. The carrier device preferably has a reinforcing structure which is provided in an area between the flight attendant seat and the passenger seat or the at least one passenger seat belonging to the row of passenger seats. In other words, the reinforcing structure of the carrier device may be accommodated in a hitherto unused area behind a passenger seat or behind a row of passenger seats. The reinforcing structure may be constructed and attached as previously mentioned.

If, in such an arrangement of the flight attendant seat behind a passenger seat or a row of passenger seats, the carrier device is constructed as a cabin partition, the space that exists between the rear side of the passenger seat and the rear side of the flight attendant seat is usually closed laterally with a trim element, for example, in the case of an arrangement which is mounted in an aircraft cabin, on a side that faces towards a main aisle of the aircraft cabin which extends in the longitudinal direction of the aircraft. This trim element may be of reinforced construction and thus simultaneously fulfil the function of the reinforcing structure, without the provision of further structural parts being necessary.

An aircraft area according to the invention comprises a door aisle which extends towards a door of the aircraft cabin. The aircraft area also comprises a passenger seating area having at least one row of passenger seats, which comprises at least one passenger seat, and also an arrangement which has been described previously.

According to an arrangement of this kind, and in an aircraft area of this kind, hitherto unused free space in the area on the rear side of a passenger seat or a row of passenger seats is used for the flight attendant seat, as a result of which it is possible to save space in a corresponding manner in the door aisle area, within which it is usually necessary to provide additional space for a flight attendant seat, even in its inoperative position. This space which has been saved may then also be taken into account as additional space in the layout of the passenger cabin.

The sequence of movement of the movable elements (seat element, backrest element and, if provided, headrest element) of the flight attendant seat takes place as described below:

In combination with the operative coupling of the seat element to the backrest element, the slideway guidance of the seat element within the carrier device permits a pivoting-and-sliding movement of the seat element from its position when the flight attendant seat is in its operative position into its position when the flight attendant seat is in its inoperative position. When the seat element is moved into the carrier device, the operative coupling of the seat element to the backrest element brings about a combined pivoting-and-sliding movement of the backrest element into the carrier device, along its pivoting-element and slideway guide, from its position when the flight attendant seat is in its operative position. Under these circumstances, because of its pivoting coupling to the carrier device, the backrest element first of all pivots, along its pivoting-element guide, from its position when the flight attendant seat is in its operative position in which the backrest element is located, at least in certain sections, outside the first surface of the carrier device, towards the carrier device, at least in certain sections, behind the first surface of the carrier device and into the latter. For this purpose, the guidance of the backrest element within the second slideway of the carrier device makes available sufficient latitude of sliding motion to permit this pivoting of the backrest element. A further pivoting-and-sliding movement of the seat element towards the carrier device and into the latter results in a sliding movement of the backrest element within its guide in the second slideway, until finally the backrest element, with the seat element moved completely into its position when the flight attendant seat is in its inoperative position, disappears, at least in part, behind the first surface of the carrier device and within the carrier device, or terminates, at least in certain sections, flush with the first surface of the carrier device. If, in addition, the flight attendant seat has a headrest element, the sliding movement of the backrest element along the second slideway of the guiding apparatus of the carrier device brings about, because of the operative coupling of the backrest element to the headrest element, a corresponding sliding movement of the headrest element, at least within its third slideway, into the carrier device, in which case, with the completion of the sliding movement of the backrest element within its second slideway, the headrest element, too, is moved into the carrier device along the at least third slideway in such a way that the headrest element disappears, at least in part, within the carrier device behind the first surface of the carrier device, and, if the headrest element does not entirely withdraw behind the first surface of the carrier device, the headrest element terminates, at least in certain sections, flush with the first surface of the carrier device. When the flight attendant seat is in its inoperative position, the seat element, too, preferably terminates, particularly with its underside, flush with the first surface of the carrier device, at least in certain sections.

At least those areas of the opening in the carrier device in which the seat element and/or the backrest element and/or the headrest element withdraw behind the first surface of the carrier device are then preferably covered by the covering previously mentioned, when the flight attendant seat is in its inoperative position.

The angle between the second slideway of the backrest element and the third and also, if present, fourth slideways of the headrest element is preferably chosen differently if the space available in the carrier device behind the first surface of the carrier device or—if the carrier device is too thinly constructed, in terms of its thickness, to receive the individual movable elements (seat element, backrest element and, if present, headrest element) of the flight attendant seat when the latter is in its inoperative position, so that these protrude, at least in part, from that second surface of the carrier device which lies opposite the first surface into the area adjacent to the second surface of the carrier device—the space available behind the second surface of the carrier device outside the latter offers a different amount of space in order to receive the movable elements of the flight attendant seat when the latter is in its inoperative position. Particularly when the carrier device is constructed as a cabin partition for demarcating a passenger seating area from a door aisle of an aircraft cabin, that area of the aircraft cabin which adjoins the second surface of the carrier device, that is, the space which remains behind the row of passenger seats behind which the cabin partition is positioned, is of differing size in cross-section. As a result of the differing angular guidance of the second slideway in relation to the third and, if applicable, fourth guideways, optimum use can be made of this receiving space of differing size.

BRIEF DESCRIPTION OF THE DRAWINGS

A preferred embodiment of the invention will now be explained in greater detail with the aid of the appended diagrammatic drawings, in which:

FIG. 1A shows a plan view of an aircraft area within which a flight attendant seat according to the invention is arranged;

FIG. 1B shows a plan view of an aircraft area within which a flight attendant seat according to the prior art is arranged;

FIG. 2A shows a side view of a detail of the aircraft area from FIG. 1, having an arrangement according to the invention, in which the diagrammatically represented flight attendant seat is located in its operative position;

FIG. 2B shows a view of the representation according to FIG. 2A, after the flight attendant seat has passed through a first phase of movement of a "folding" process which serves to transfer the flight attendant seat from its operative position into its inoperative position;

FIG. 2C shows a view of the representation according to FIG. 2A, after the flight attendant seat has passed through a second phase of movement of the "folding" process;

FIG. 2D shows a view of the representation according to FIG. 2A after the flight attendant seat has passed through a third phase of movement of the "folding" process; and FIG. 2E shows a view of the representation according to FIG. 2A, in which the diagrammatically represented flight attendant seat is located in its inoperative position after completion of the "folding" process.

DETAILED DESCRIPTION OF THE PREFERRED EMBODIMENTS

An aircraft area 100 according to the invention may, as illustrated in FIG. 1A, comprise an aircraft door 102 and also a door aisle 104 which extends, from the aircraft door 102, perpendicularly to a longitudinal axis of the aircraft. A main aisle may extend parallel to the longitudinal axis of the aircraft, in a manner substantially perpendicular to the door aisle 104. The door aisle 104 may be adjoined by a so-called "assist space" 108, which is so dimensioned and arranged that a flight attendant is able to stand upright in it. This assist space 108 may extend over a partial section of the door aisle 104. The aircraft area 100 may also comprise a passenger seating area 110 which has at least one row 112 of passenger seats having at least one passenger seat 114. According to FIG. 1A, the row 112 of passenger seats in the passenger seating area 110 comprises three passenger seats 114 which are arranged side by side in the direction perpendicular to the longitudinal axis of the aircraft. Arranged between the door aisle 104 and the passenger seating area 110 is a flight attendant seat 10 according to the invention. This flight attendant seat 10 comprises a carrier device 12 having a first surface 14. In FIG. 1A, the flight attendant seat 10 is represented in its inoperative position, in which no structural part of the flight attendant seat 10 protrudes from the first surface 14 of the carrier device 12. The carrier device 12 in question is preferably an aircraft cabin partition. The carrier device 12 is preferably connected, in the form of the aircraft cabin partition, to the load-bearing structure of the aircraft via a floor of the aircraft cabin. The carrier device 12 may comprise a reinforcing structure 16 for structural support purposes and for the subsidiary diversion of forces, which act upon the flight attendant seat 10 when the latter is being used, to the load-bearing structure of the aircraft. This reinforcing structure 16 preferably extends into a space which is bounded by a second surface 18 of the carrier device 12 that lies opposite the first surface 14 of the carrier device 12 and by the rear side and the under-seat area of the row 112 of passenger seats.

FIG. 1B shows a plan view, which is similar to the representation from FIG. 1A, of an aircraft area 200 having an aircraft door 202 and also a door aisle 204 which is adjacent to the aircraft door. Also adjoining the door aisle 204 is an assist space 208. However the flight attendant seat 20 which is arranged in a manner adjoining the door aisle 204 is arranged completely outside an aircraft cabin partition 22 which demarcates the door aisle 204 from an aircraft cabin area 210, so that the flight attendant seat 20 merely adjoins a first surface 24 of the aircraft cabin partition 22 and therefore takes up additional installation space within the door aisle 204. In order to adhere to the dimensions of the door aisle 204 which are specified for an escape route from the aircraft cabin 200 through the aircraft door 202, the door aisle 204 must therefore be configured so as to be wider than is the case in the variant according to the invention according to FIG. 1A. Compared to the flight attendant seat arrangement according to the prior art shown in FIG. 1B, use is consequently made, in the arrangement according to the invention according to FIG. 1A, of hitherto unused installation space in order to save on the installation space in the door aisle which has been additionally required until now, and thus to make available more room for a reconfiguration of the cabin layout.

An explanation will be given below, with the aid of the representations according to FIGS. 2A to 2E, of how the "folding" process of the flight attendant seat 10 according to the invention proceeds, starting from its operative position (FIG. 2A) in which the use of the flight attendant seat 10 by a flight attendant is possible, into its inoperative position (FIG. 2E) in which the flight attendant seat 10 is stowed in a space-saving manner with optimized utilization of space. It should be pointed out, first of all, that in spite of the use of the term "folding" process, this does not involve simple folding movements of the movable elements (seat element, backrest element and, if present, headrest element) but rather, in the case of the seat element and backrest element, combined pivoting-and-sliding movements and, in the case of the headrest element, a simple sliding movement.

FIGS. 2A to 2E show side views of the row 112 of passenger seats from FIG. 1A, of the carrier device 12 of the flight attendant seat 10, which carrier device adjoins the row 112 of passenger seats in the rear area of the latter, and also—represented diagrammatically—individual movable components (seat element 40, backrest element 42 and headrest element 46) of the flight attendant seat 10. Although, according to FIGS. 2A to 2E, the headrest element 46 is a component of the flight attendant seat 10, this is an optional component which does not absolutely have to be provided. FIG. 2A shows the flight attendant seat 10 in its operative position which permits the use of the flight attendant seat 10 by a flight attendant. The carrier device 12 of the flight attendant seat 10, which carrier device is preferably constructed as an aircraft cabin partition, may be fastened to the load-bearing structure of the aircraft via a plurality of fastening points 30, 32 in the floor area of the aircraft cabin and/or in the wall area of the cabin and/or in the ceiling area of the cabin. The carrier device 12 and also the fastening points 30, 32 are constructed in such a way that the diversion, to the load-bearing structure of the aircraft, of the forces which have the maximum effect upon the flight attendant seat 10 when the latter is being used, is guaranteed. For the purpose of assisting this diversion of force, the carrier device 12 may, as already mentioned, have a reinforcing structure 16 which preferably extends, starting from that second surface 18 of the carrier device 12 which lies opposite the first surface 14 of the carrier device 12, into a hitherto unused space bounded by the rear side of the row 112 of passenger seats and the second surface 18 of the carrier device 14, and is constructed for the purpose of assisting the diversion of force to the load-bearing structure of the aircraft via the floor of the aircraft cabin and/or the wall of the cabin. A lateral visual screening covering for the space bounded by the second surface 18 of the carrier device 12 and the rear side of the row 112 of passenger seats may be constructed in such a way that it assumes, at least in part, the function of the reinforcing structure 16. It is thus possible to dispense, at least in part, with a separate reinforcing structure and additional structural weight associated with the latter.

The individual phases of movement in the "folding" process which is necessary in order to transfer the flight attendant seat 10 from its operative position, which is shown in FIG. 2A, into its inoperative position, which is shown in FIG. 2E, will now be explained in greater detail with the aid of FIGS. 2A to 2E. As already mentioned, the flight attendant seat 10 comprises movable elements. Thus, a seat element 40 is movably coupled to the carrier device 12. A backrest element 42 is also movably coupled to the carrier device 12. The backrest element 42 is also operatively coupled to the seat element 40. This operative coupling is preferably realized by means of a coupling element 44 which is mounted, in a rotationally movable manner, both on the seat element 40 and on the backrest element 42. Another structural part of the flight attendant seat 10 may be a headrest element 46 which is movably coupled to the carrier device 12. This headrest element 46 is then operatively coupled to the backrest element 42. This operative coupling may be realized by means of a second coupling element 48 which is fastened, by one end, to the headrest element 46 and whose other end is coupled to the backrest element 42 in such a way that a pivoting movement of the backrest element 42, relative to the second coupling element 48, is possible.

Furthermore, the carrier device 12 may have a guiding arrangement for guiding the seat element 40 and also the backrest element 42 and, if present, the headrest element 46 when the flight attendant seat 10 is moved between its operative and inoperative positions. This guiding arrangement preferably comprises a plurality of slideways 50, 52, 54, 56 and also at least one pivoting element 58. Under these circumstances, the seat element 40 may be guided in at least one first slideway 50, the backrest element 42 may be guided in at least one second slideway 52 and on the at least one pivoting element 58, and, if present, the headrest element 46 may be guided in at least one third slideway 54 and also, if desired, in at least one fourth slideway 56. Under these circumstances, it is particularly advantageous if each of the aforesaid slideways 50 to 56 is constructed by a pair of slide rails provided, in each case, on opposite sides of the movable elements 40, 42 and 46 of the flight attendant seat 10. It is then possible for projections, which are arranged, in each case, on the opposite sides of the movable elements 40, 42 and 46 of the flight attendant seat 10, to engage in these slide rails in order to guarantee sliding guidance of the movable elements 40, 42 and 46 therein.

The first slideway 50 for guiding the seat element 40 is preferably of semicircular design, and the other slideways, namely the second slideway for guiding the backrest element 42, the third slideway 54 and, if present, the fourth slideway 56 for guiding the headrest element 46, are preferably of rectilinear design in each case. The second slideway 52 may allow a sliding movement of the backrest element 42 at a first angle, relative to the longitudinal axis of the carrier device 12, the longitudinal axis of the carrier device 12 extending, when the flight attendant seat 10 is in the installed state in the aircraft cabin 100, perpendicularly to the longitudinal axis in the vertical direction of the aircraft cabin 100. The second slideway 52 may also form this first angle with at least one of the two surfaces 14, 18 of the carrier device 12. The third and, if present, the fourth slideway 54, 56, too, may permit a sliding movement of the headrest element 46 at a second angle relative to the longitudinal axis of the carrier device 12. This second angle is different from the first angle and is preferably greater. The third and, if applicable, fourth slideways 54, 56 too, may also form this second angle with at least one of the two surfaces 14, 18 of the carrier device 12. The difference in angles is necessary in order to make optimum use of the receiving space of differing size which is available on the rear side of the row 112 of passenger seats for receiving the movable elements 40, 42, 46 of the flight attendant seat 10.

According to the preferred embodiment in FIGS. 2A to 2E, the headrest element 46 can be displaced only in a rectilinear manner in its third and, if applicable, fourth slideway 54, 56, relative to the carrier device 12. On the other hand, the backrest element 42 is guided on the carrier device 12 in such a way that it is able to perform a combined pivoting-and-gliding movement relative to the carrier device 12. For this purpose, an upper section 42a of the backrest element 42 is guided in the second slideway 52, whereas a lower section 42b of the backrest element 42 is coupled in a pivoting manner to the carrier device 12 by means of the at least one pivoting element 58. For this pivoting coupling, the pivoting element 58 is rotatably mounted on the lower section 42b of the backrest element 42, on the one hand, and rotatably mounted on the carrier device 12 on the other hand. The seat element 40 comprises a first section 40a, which is constructed for guidance in the first slideway 50, an opposed second, free section 40b and also a third section 40c which lies between the first section 40a and the second section 40b of the seat element 40. A seating face may be provided in the second and, at least in part, in the third section 40b, 40c of the seat element 40. In the area of the third section 40c of the seat element 40, the seat element is preferably coupled in a rotationally movable manner to the coupling element 44. If the second area 40b of the seat element 40 is now moved towards the carrier device 12, and preferably obliquely upwards towards the upper section 42a of the backrest element 42, the first section 40a of the seat element 40 slides along the first slideway 50 and the coupling element 44, which is attached in a rotationally movable manner to the seat element 40 and to the backrest element 42 at fixed points of rotation 44a and 44b, causes, in addition to a pivoting of the seat element 40 towards the carrier device 12, a simultaneous pivoting-and-sliding movement of the backrest element 42 about a point of rotation 60, at which the pivoting element 58 is rotatably mounted on the carrier device 12, and also along the second slideway 52, initially in a first direction, namely towards the first surface 14 of the carrier device 12, preferably until an end of the second slideway 52 towards the first surface 14 of the carrier device 12 is reached. After the completion of this first phase of movement of the "folding" process of the flight attendant seat 10, the movable elements 40, 42 and 46 of the flight attendant seat 10 are now located in the relative arrangement according to the representation in FIG. 2B. Both the seat element 40 and the backrest element 42 have performed a combined pivoting-and-sliding movement.

If the sliding guidance of the backrest element 42 is located, as shown in FIG. 2B, at or near the first end of the first slideway 52, which end lies in the direction of the first surface 14 of the carrier device 12, the upper section 42a of the backrest element 42 is located, relative to its position in FIG. 2A, in a position which is elevated in the longitudinal direction of the carrier device 12. Since the second coupling element 48 between the backrest element 42 and the headrest element 46 merely permits a tilting of the backrest element 42, but no movement of the two elements 42 and 46 towards one another, this initial upward movement of the backrest element 42 in the first phase of movement of the "folding" process of the flight attendant seat 10, brings about a corresponding upward movement of the headrest element 46; that is, a sliding of the headrest element 46 along its third slideway 54 and, if applicable, fourth slideway 56 towards the first surface 14 of the carrier device 12.

When the second section 40b of the seat element 40 is moved onwards towards the carrier device 12, preferably obliquely upwards, the upper section 42a of the backrest element 42 merely continues to slide in the second slideway 52 and the headrest element 46 also merely continues to slide in its third slideway 54 and also, if applicable, fourth slideway 56, in a second direction, which is opposed to the first phase of movement, that is, towards the second surface 18 of the carrier device 12 (see FIGS. 2C and 2D) and also, in the concluding phase of movement according to FIG. 2E, out of this second surface 18 of the carrier device 12. As is represented in FIG. 2C, a further movement of the second section 40b of the seat element 40 towards the carrier device 12 leads to a further movement of the first section 40a of the seat element 40 along the first slideway 50 and, according to the operative coupling by means of the coupling element 44, to a further pivoting of the seat element 40 towards the carrier device 12 and also to a further tilting of the backrest element 42 about the point of rotation 60 of the pivoting element 58 coupled to the lower section 42b of the backrest element 42, accompanied by a sliding movement of the upper section 42a of the backrest element 42 along the slideway 52 in the second direction. In FIG. 2c, at least the lower section 42a of the backrest element 42 is already located entirely behind the first surface 14 in the carrier device 12, and already even protrudes, in part, through the carrier device 12, that is, from the second surface 18 of the carrier device 12 again. The upper section 42a of the backrest element 42 still projects, at least in part, from the first surface 14 of the carrier device 12 and is guided, approximately, in a first third of the second slideway 52—assuming that the dividing of the second slideway 52 into three parts takes place, starting from the first surface 14 of the carrier device 12 towards the second surface 18 or in the direction out of the second surface 18 of the carrier device 12.

As a result of the operative coupling of the backrest element 42 to the headrest element 46 with the aid of the second coupling element 48, a tractive force in the direction of the longitudinal axis of the carrier device 12 downwards, that is towards the floor of the aircraft cabin, acts upon the headrest element 46 in the phase of movement, which is now the second phase of movement, of the combined pivoting-and-sliding movement of the backrest element 42. What is brought about as a result of this is also a corresponding movement of the headrest element 46 along its third slideway 54 and, if applicable, fourth slideway 56, so that, after completion of the second phase of movement of the "folding" process, as shown in FIG. 2C, the headrest element 46, too, is guided in a first third of the third slideway 54 and, if applicable, of the fourth slideway 56. The subdivision of the slideway is carried out, in this case in a manner similar to the subdivision of the second slideway 52.

After a further movement of the second section 40b of the seat element 40 towards the carrier device 12, preferably obliquely upwards, that is, after completion of a third phase of movement of the "folding" process, the movable elements 40, 42 and 46 of the flight attendant seat 10 reach the relative positions such as are shown in FIG. 2D. In detail, this further movement of the second section 40b of the seat element 40 towards the carrier device 12 brings about a further sliding of the first section 40a of the seat element 40 along the first slideway 50, accompanied by a further pivoting of the seat element 40 towards the carrier device 12. This causes a further tilting of the lower section 42b of the backrest element 42 out of the second surface 18 of the carrier device 12, that is, a further tilting of this lower section 42b of the backrest element 42 towards the rear side of the row 112 of passenger seats about the point of rotation 60 about which the pivoting element 58 mounts the backrest element 42 in a tiltable manner. This further tilting of the backrest element 42 is accompanied by a further sliding movement of the backrest element 42 and, in particular, its upper area 24a, within the second slideway 52 of the carrier device 12 in the second direction, until the sliding guidance reaches about two thirds of the second slideway 52 in the direction from the first surface 14 of the carrier device 12 to the second surface 18 of the carrier device 12 and beyond.

In a third phase of movement, a further lowering of the backrest element 42 towards the floor of the aircraft cabin, that is, downwards in the direction of the longitudinal axis of the carrier device 12 (See FIG. 2D), occurs, relative to the position of the backrest element 42 shown in FIG. 2C. With the aid of the operative coupling of the backrest element 42 to the headrest element 46 by means of the second coupling element 48, this further lowering of the backrest element 42 causes a further lowering of the headrest element 46 and a simultaneous sliding of the latter along its third and, if applicable, fourth slideway 54, 56, until likewise up to about ⅔ of the third and, if applicable, fourth slideway 54, 56 have been covered, starting from the first surface 14 of the carrier device 12 and towards its second surface 18 and beyond. This brings about a sliding of the headrest element 46 into the carrier device 12 and a least a partial withdrawal of the headrest element 46 behind the first surface 14 of the carrier device 12.

In the subsequent final movement phase of the "folding" process, the second section 40b of the seat element 40 is moved into the carrier device 12 in such a way, and the first section 40a of the seat element 40 slides up to the end of the first slideway 50 in such a way, that an underside 40u of the seat element 40 terminates flush with the first surface 14 of the carrier device 12. As a result of this concluding movement for transferring the seat element 40 into its position when the flight attendant seat 10 is in its inoperative position, the backrest element 42, too, is tilted further about the point of rotation 60 and simultaneously slides within the second slideway 52 as far as that end of the backrest element which protrudes from the second surface 18 of the carrier device 12. This leads to a further lowering of the backrest element 42 (see FIG. 2E). Because of this further lowering of the backrest element 42 as a result of its concluding pivoting-and-sliding movement in the final phase of movement of the "folding" process, the headrest element 46 is also drawn further "downwards" as a result of its operative coupling with the backrest element 42, that is, slides further in the second direction along its third slideway 54 and, if applicable, fourth slideway 56 as far as its/their end(s) which protrude(s) from the second surface 18 of the carrier device 12. This leads to a complete countersinking of the headrest element 46 within the carrier device 12 in such a way that the headrest element 46 disappears, in part, within the carrier device 12 or even slides out of the second surface 18 of the latter into a rearward area behind the row 112 of passenger seats and terminates, in part, flush with the first surface 14 of the carrier device 12 (see FIG. 2E).

An opposite movement of the flight attendant seat 10 from its inoperative position into its operative position takes place in the reverse sequence of movement.

Generally speaking, it is possible to construct at least one of the slideways 50, 52, 54, 56, and particularly its pair of rails, in the form of a groove or grooves, respectively. Corresponding projections on the guided seat/backrest/headrest elements 40, 42, 46 may then engage in these grooves in order to be guided in a sliding manner therein.

As can be seen from the preceding description of the figures, the carrier device 12, which may be constructed, in particular, as an aircraft cabin partition, may have a thickness which is not sufficient to receive at least one of the movable elements (seat element 40, backrest element 42 and/or headrest element 46) completely within it. Rather, the movable elements of the flight attendant seat 10 according to the embodiments represented in FIGS. 2A to 2E are countersunk within the carrier device 12 in such a way that they pass through the latter, at least in part, in order to emerge again from its second surface 18 on the opposite side of the carrier device 12. However this is not disadvantageous, since the area adjacent to the second surface 18 of the carrier device 12 preferably adjoins a rear side of a row 112 of passenger seats or at least a backrest of a passenger seat 114 and, in a further preferred manner, is covered laterally by a covering which extends in an intermediate area between the rear side of the row 112 of passenger seats or of the passenger seat 114 and the second surface 18 of the carrier device 12. It is thus possible for the emergence of the movable elements 40, 42, 46 of the flight attendant seat 10 from the second surface 18 of the carrier device 12 to be visually concealed, when the flight attendant seat 10 is moved from its operative position into its inoperative position, by structural parts of the passenger cabin of the aircraft which are already present. In order to also cover the opening in that second surface 18 of the carrier device 12 which may possibly extend over a headrest area 114a of the passenger seat 114 or row 112 of passenger seats and from which, when the flight attendant seat 10 is in its inoperative position, the latter's headrest element, if present at all, protrudes from the second surface 18 of the carrier device 12 in the direction of the passenger seating area, there may be provided, for example, an elastic covering which is sufficiently flexible to permit the emergence of the headrest element 46. As an alternative to this, other coverings are also possible.

Although it is conceivably possible to configure the carrier device 12, in terms of its thickness, in such a way that at least the headrest element can be completely received within the carrier device 12 without protruding from the second surface 18 of the carrier device 12 when the flight attendant seat 10 is in its inoperative position, it is nevertheless desirable to choose the weight of structural parts of the aircraft in the passenger cabin to always be as low as possible, and therefore to construct the carrier device 12 to be as thin as possible. In order to achieve, in spite of the thinnest possible construction of the carrier device 12, an adequate load-bearing capacity, which is a prerequisite for mounting the flight attendant seat 10 within the aircraft cabin 100, it is particularly advantageous to configure the lateral covering of the area between the second surface 18 of the carrier device 12 and the rear side of the row 112 of passenger seats, or of the individual passenger seat 114, in such a way that the covering acts as a reinforcing structure 16 for the carrier device 12. This covering is then part of the carrier device 12. In addition, this permits better distribution of the load.

As has already been described with the aid of FIGS. 2A to 2E with reference to the "folding" process for moving the flight attendant seat 10 from its operative position into its inoperative position, a single manual intervention is sufficient to move the flight attendant seat from its operative position into its inoperative position. The movement of the flight attendant seat 10 from its operative position into its inoperative position is advantageously assisted by at least one draw spring, which is arranged between the seat element 40 and the carrier device 12 and/or the backrest element 42 and the carrier device 12 and dimensioned in such a way that it assists a movement of the movable elements 40, 42, 46 of the flight attendant seat 10 from its operative position into its inoperative position. Alternatively, it is also conceivably possible to automate the process for "folding" the flight attendant seat 10 from its operative position into its inoperative position and/or in the opposite direction, from its inoperative position into its operative position. For example, the draw spring may be dimensioned, for this purpose, in such a way that the "folding" process is performed completely automatically, at least in one direction. A manual action is then eliminated, at least when the flight attendant seat 10 is moved from its operative position into its inoperative position. When the flight attendant seat 10 is located in its operative position or its inoperative position, it may be kept in position by means of an arresting mechanism. This is particularly advantageous if the flight attendant seat 10 is pretensioned towards one of its two final positions. An arresting mechanism of this kind may permit, for example, latching of at least one movable element (seat element 40, backrest element 42, headrest element 46) of the flight attendant seat 10 on and/or in the carrier device 12. In the case of an automated "folding" process, an arresting mechanism is preferably triggered automatically. In the case of a manual "folding" process, which is preferably spring-assisted, at least in one direction of movement, the arresting mechanism may be triggered, for example, by the action of a force upon the seat element 40 in the desired direction of movement. In order to make it easier to act upon the seat element for the purpose of moving the flight attendant seat 10 from its inoperative position into its operative position, an actuating or engaging facility may be provided on the underside of the seat element. This actuating/engaging facility may also be constructed for the purpose of releasing an arresting mechanism for the flight attendant seat 10.

If, as shown in the figures, the carrier device 12 is constructed as an aircraft cabin partition, it may additionally be constructed for receiving a stretcher and/or other components for providing for the passenger cabin in an emergency. Further structural weakening of the carrier device 12 which may thereby occur next to the opening for receiving the movable elements 40, 42, 46 of the flight attendant seat 10, is preferably compensated for by the reinforcing structure 16 of the carrier device.

The flight attendant seat according to the present application offers the advantage that, as a result of the integration of its movable elements into the carrier device and the advantageous arrangement of the carrier device in the rear area of at least one passenger seat, there is a saving of the installation space, which has hitherto been additionally necessary, for arranging a conventional flight attendant seat. The space available in the passenger cabin is thereby increased, and is available for a more convenient cabin layout, also in consideration of aesthetic aspects an airline prefers, or, even, more efficient cabin layout. There is thus now also the possibility to increase the number of flight attendant seats resulting in the option to take more crew members, such as off-duty crew members, on a flight without thereby limiting the passenger seat capacity.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A flight attendant seat comprising:
a carrier device having a first surface and a second surface opposite the first surface,
a seat element movably coupled to said carrier device, and
a backrest element movably coupled to said carrier device and being operatively coupled to said seat element,
wherein the flight attendant seat is movable between an operative position, which permits the use of said flight attendant seat by a flight attendant, and an inoperative position in which the seat element and the backrest element are positioned, relative to the carrier device, in such a way that they do not protrude from the first surface of said carrier device, wherein the first surface of the carrier device has at least one opening allowing the seat element and the backrest element of the flight attendant seat to emerge out therethrough when said flight attendant seat is moved from its inoperative position into its operative position, and wherein, in the inoperative position of the flight attendant seat, the seat element and the backrest element are positioned such that at least a part or section of at least one of the seat element and the backrest element protrudes from the second surface of the carrier device.

2. The flight attendant seat according to claim 1, wherein the seat element and the backrest element are positioned, when the flight attendant seat is in its operative position, in such a way, relative to the carrier device, that the seat element and the backrest element do not protrude from a second surface of said carrier device that lies opposite the first surface of said carrier device.

3. The flight attendant seat according to claim 1, wherein the carrier device is constructed, in its shape and size, in such a way that it is capable of diverting, via at least one of a floor of the aircraft cabin, a side wall of the aircraft cabin and a ceiling of the aircraft cabin, a specified maximum force which may be introduced when the flight attendant seat is being used in its operative position by a flight attendant.

4. The flight attendant seat according to claim 1, wherein the carrier device comprises a cabin partition and the two surfaces of said carrier device correspond to opposite surfaces of said cabin partition.

5. The flight attendant seat according to claim 1, wherein the movement of the flight attendant seat between its inoperative and operative positions takes place automatically or manually, and a manual movement of said flight attendant seat from its operative position into its inoperative position is spring-assisted.

6. The flight attendant seat according to claim 1, which is constructed as a double flight attendant seat.

7. The flight attendant seat according to claim 1, wherein the seat element and the backrest element are positioned, when the flight attendant seat is in its operative position, in such a way, relative to the carrier device, that they do not protrude from the second surface of said carrier device that lies opposite the first surface of said carrier device.

8. The flight attendant seat according to claim 1, wherein the carrier device has a guiding arrangement to guide the seat element and also the backrest element when the flight attendant seat is moved between its operative and inoperative positions.

9. The flight attendant seat according to claim 8, wherein the guiding arrangement comprises a plurality of slideways and also at least one pivoting element.

10. The flight attendant seat according to claim 9, wherein the seat element is guided in at least one first slideway, and the backrest element is guided in at least one second slideway and also on at least one pivoting element.

11. The flight attendant seat according to claim 10, wherein the at least one second slideway for guiding the backrest element is rectilinear and forms a first angle with a longitudinal axis of the carrier device.

12. The flight attendant seat according to claim 10, wherein the movement of the flight attendant seat between its operative and inoperative positions comprises a corresponding movement of the seat element between its positions when the flight attendant seat is in its operative and inoperative positions, and also a corresponding movement of the backrest element between its positions when the flight attendant seat is in its operative and inoperative positions, and the seat element is operatively coupled, by means of at least one first coupling element, to the backrest element in such a way that the movement of the seat element between its positions when the flight attendant seat is in its operative and inoperative positions brings about the movement of the backrest element between its positions when the flight attendant seat is in its operative and inoperative positions for the purpose of moving said flight attendant seat between its operative and inoperative positions.

13. The flight attendant seat according to claim 1, further comprising a headrest element movably coupled to the carrier device and which is operatively coupled to the backrest element and is positioned, when the flight attendant seat is in its inoperative position, in such a way that the headrest element does not protrude from the first surface of the carrier device.

14. The flight attendant seat according to claim 13,
wherein the movement of the flight attendant seat between its operative and inoperative positions comprises a corresponding movement of the seat element between its positions when the flight attendant seat is in its operative and inoperative positions, and also a corresponding movement of the backrest element between its positions when the flight attendant seat is in its operative and inoperative positions, and the seat element is operatively coupled, by means of at least one first coupling element, to the backrest element in such a way that the movement of the seat element between its positions when the flight attendant seat is in its operative and inoperative positions brings about the movement of the backrest element between its positions when the flight attendant seat is in its operative and inoperative positions for the purpose of moving said flight attendant seat between its operative and inoperative positions, and wherein the movement of the flight attendant seat between its operative and inoperative positions also comprises a corresponding movement of the headrest element between its positions when said flight attendant seat is in its operative and inoperative positions, and the backrest element is operatively coupled, by means of at least one second coupling element, to the headrest element in such a way that the movement of said backrest element between its positions when the flight attendant seat is in its operative and inoperative positions brings about the movement of the headrest element between its positions when said flight attendant seat is in its operative and inoperative positions.

15. The flight attendant seat according to claim 13, wherein the seat element, the backrest element and the headrest element are positioned, when the flight attendant seat is in its operative position, in such a way, relative to the carrier device, that they do not protrude from the second surface of said carrier device that lies opposite the first surface of said carrier device.

16. The flight attendant seat according to claim 13, wherein the carrier device has a guiding arrangement for guiding the seat element, the backrest element and the headrest element, when the flight attendant seat is moved between its operative and inoperative positions.

17. The flight attendant seat according to claim 16, wherein the seat element is guided in at least one first slideway, and the backrest element is guided in at least one second slideway and also on at least one pivoting element and the headrest element is guided in at least one third, and also at least one fourth, slideway.

18. The flight attendant seat according to claim 17, wherein the at least one second slideway for guiding the backrest element is rectilinear and forms a first angle with a longitudinal axis of the carrier device, and the at least one third slideway for guiding the headrest element is likewise rectilinear and forms, with the longitudinal axis of said carrier device, a second angle that differs from the first angle.

19. An arrangement having:
a flight attendant seat according to claim 1, and
a passenger seat or a row of passenger seats having at least one passenger seat,
wherein the flight attendant seat is positioned in such a way, relative to the passenger seat or row of passenger seats, that a rear side of the backrest element of the flight attendant seat faces towards a rear side of a backrest of the passenger seat or a rear side of a backrest of at least one passenger seat belonging to the row of passenger seats, and wherein the carrier device comprises a reinforcing structure which is provided in an area between the flight attendant seat and the passenger seat or the at least one passenger seat belonging to the row of passenger seats.

20. An aircraft area having:
a door aisle,
a passenger seating area having at least one row of passenger seats, comprising at least one passenger seat, and
an arrangement according to claim 19.

* * * * *